United States Patent
Tabarovsky et al.

(10) Patent No.: US 8,400,158 B2
(45) Date of Patent: Mar. 19, 2013

(54) IMAGING IN OIL-BASED MUD BY SYNCHRONIZING PHASES OF CURRENTS INJECTED INTO A FORMATION

(75) Inventors: Leonty A. Tabarovsky, Cypress, TX (US); Stanislav W. Forgang, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/280,755

(22) Filed: Oct. 25, 2011

(65) Prior Publication Data

US 2012/0274329 A1    Nov. 1, 2012

Related U.S. Application Data

(60) Provisional application No. 61/408,377, filed on Oct. 29, 2010.

(51) Int. Cl.
*G01V 3/08* (2006.01)
*G01V 3/18* (2006.01)
(52) U.S. Cl. .................... 324/338; 324/339
(58) Field of Classification Search .............. 324/338, 324/339
See application file for complete search history.

(56) References Cited

U.S. PATENT DOCUMENTS

| | | | |
|---|---|---|---|
| 3,579,098 A | 5/1971 | Mougne |
| 4,019,125 A | 4/1977 | Daniel |
| 4,837,518 A | 6/1989 | Gard et al. |
| 5,056,067 A | 10/1991 | Drumheller |
| 5,869,968 A | 2/1999 | Brooks et al. |
| 6,225,806 B1 | 5/2001 | Millar et al. |
| 7,119,544 B2 | 10/2006 | Hayman et al. |
| 2001/0043066 A1 | 11/2001 | Hawkes et al. |
| 2003/0122547 A1 | 7/2003 | Prammer |
| 2004/0046559 A1 | 3/2004 | Flanagan |
| 2005/0067190 A1 | 3/2005 | Tabanou et al. |
| 2005/0068036 A1 | 3/2005 | Wang et al. |
| 2006/0055418 A1 | 3/2006 | Ogilvy et al. |
| 2008/0040042 A1 | 2/2008 | Page |
| 2009/0072833 A1 | 3/2009 | Tabarovsky |

OTHER PUBLICATIONS

L. San Matin et al, Oil-Based Mud Imaging Tool Generates High Quality Borehole Images In Challenging Formation and Borehole Condition, Including Thin Beds, Low Resistive Formations, and Shales, Conference Paper, May 25-28, 2008, 5 pages, Society of Petrophysicists and Well-Log Analysts.

Lofts, J., A New Micro-Resistivity Imaging Device for Use in Oil-Based Mud, Conference Paper, 2002, 14 pages, Society of Petrophysicists and Well-Log Analysts.

Mezzatesta A.G. et al, Integrated 2-D Interpretation of Resistivity Logging Measurements by Inversion Methods, Conference Paper, 1995, 8 pages, Society of Petrophysicists and Well-Log Analysts.

Mezzatesta A.G. et al, Integrated Interpretation of Galvanic and Induction Measurements by Inversion Methods, Conference Paper, Mar. 11-14, 1995, 9 pages, Society of Petroleum Engineers.

(Continued)

*Primary Examiner* — Reena Aurora
(74) *Attorney, Agent, or Firm* — Cantor Colburn LLP

(57) ABSTRACT

Disclosed is an apparatus for estimating a property of an earth formation penetrated by a borehole. The apparatus includes a carrier configured to be conveyed through the borehole. A first transmitter electrode and a second transmitter electrode are disposed at the carrier and configured to inject an electrical current into the earth formation. A first measurement electrode and a second measurement electrode are disposed at the carrier and configured to measure the electrical current to estimate the property of the earth formation. A first bucker amplifier is coupled to the first measurement electrode and a second bucker amplifier is coupled to the second measurement electrode, wherein the first and second bucker amplifiers are configured to equalize electrical potentials of areas in front of the first and second measurement electrodes.

20 Claims, 5 Drawing Sheets

OTHER PUBLICATIONS

Mezzatesta, A.G. et al, Simultaneous Inversion of Galvanic and Induction Logging Measurements to Improve Resolution, Conference Paper, Apr. 27-29, 1994, 15 pages, Society of Petroleum Engineers.

Notification of Transmittal of the International Search Report and the Written Opinion of the International Searching Authority, or the Declaration; PCT/US2011/058113; Jun. 29, 2012.

Notification of Transmittal of the International Search Report and the Written Opinion of the International Searching Authority, or the Declaration; PCT/US2012/031419; Oct. 31, 2012.

Notification of Transmittal of the International Search Report and the Written Opinion of the International Searching Authority, or the Declaration; PCT/US2012/031421; Oct. 31, 2012.

Notification of Transmittal of the International Search Report and the Written Opinion of the International Searching Authority, or the Declaration; PCT/US2012/031424; Nov. 1, 2012.

IMAGING IN OIL-BASED MUD BY SYNCHRONIZING PHASES OF CURRENTS INJECTED INTO A FORMATION

CROSS REFERENCE TO RELATED APPLICATIONS

This application claims the benefit of an earlier filing date from U.S. Provisional Application Ser. No. 61/408,377 filed Oct. 29, 2010, the entire disclosure of which is incorporated herein by reference.

BACKGROUND

1. Field of the Invention

The present invention relates to the analysis of underground earth formations, and, more particularly, to the determination of formation resistivity.

2. Description of the Related Art

Boreholes are drilled into the earth for many applications such as hydrocarbon production, geothermal production, and carbon dioxide sequestration. In order to efficiently use expensive resources drilling the boreholes, it is important for analysts to acquire detailed information related to the geologic formations being drilled.

Resistivity imaging is one type of process for obtaining the detailed information. In resistivity imaging, both electrical and induction resistivity instruments can be used. The resistivity of a formation is measured as a function of depth using a resistivity tool disposed in a borehole penetrating the formation. Variations in the resistivity are plotted or displayed to provide an image of the formation.

In electrical resistivity imaging, one or more transmitter electrodes are used to inject an electric current into an earth formation. Measurement electrodes, sometimes referred to as button electrodes, then perform electrical measurements that are used to determine the resistivity of the earth formation. Because the transmitter and transmitter electrodes are deployed in a drilled borehole having small variations in diameter due to the drilling process, the electrodes may not make contact with the borehole wall. The space or distance between an electrode and the borehole wall is referred to as the "standoff." Unfortunately, when using oil-based drilling mud, if the drilling mud enters a standoff, erratic images can be acquired. It would be well received in the art if the quality of resistivity images could be improved when using oil-based drilling mud.

BRIEF SUMMARY

Disclosed is an apparatus for estimating a property of an earth formation penetrated by a borehole, the apparatus includes: a carrier configured to be conveyed through the borehole; a first transmitter electrode and a second transmitter electrode disposed at the carrier and configured to inject an electrical current into the earth formation; a first measurement electrode and a second measurement electrode disposed at the carrier and configured to measure the electrical current to estimate the property of the earth formation; and a first bucker amplifier coupled to the first measurement electrode and a second bucker amplifier coupled to the second measurement electrode, wherein the first and second bucker amplifiers are configured to equalize electrical potentials of areas of the formation in front of the first and second measurement electrodes.

Also disclosed is a method for estimating a property of an earth formation, the method includes: injecting an electrical current into the formation using a first transmitter electrode and a second transmitter electrode; equalizing a first electrical potential of a first measurement electrode area of the formation in front of a first measurement electrode with a second electrical potential of a second measurement electrode area of the formation in front of a second measurement electrode using a first measurement bucking amplifier coupled to the first measurement electrode and a second measurement bucking amplifier coupled to the second measurement electrode; and measuring the electrical current with the first measurement electrode and the second measurement electrode to estimate the property.

Further disclosed is a non-transitory computer readable medium comprising computer executable instructions for estimating a parameter of an earth formation by implementing a method that includes: injecting an electrical current into the formation using a first transmitter electrode and a second transmitter electrode; equalizing a first electrical potential of a first measurement electrode area of the formation in front of a first measurement electrode with a second electrical potential of a second measurement electrode area of the formation in front of a second measurement electrode using a first measurement bucking amplifier coupled to the first measurement electrode and a second measurement bucking amplifier coupled to the second measurement electrode; and measuring the electrical current with the first measurement electrode and the second measurement electrode to estimate the property.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the Figures.

Resistivity imaging instruments operating in boreholes filled with non-conductive oil-based drilling fluid conduct measurements using alternating current to overcome impedance introduced by both "standoff" and mud invasion zone. The currents are injected by transmitter electrodes driven by a voltage source at frequency $f=\omega/2\pi$. Measurements are based on the sensing of that component of electric current flowing through the measurement electrodes that is in-phase with the signal of the voltage source. By convention, this in-phase component of the measured current is called the "real" component of the measured current. In addition, by convention, electrode separation from the borehole wall together with the above-mentioned invasion zone is referred to as tool "standoff." The electrode separation and the invasion zone are electrically connected in series and they both present high impedance to injected electrical current prior to it entering the geologic formation. Uneven standoffs of transmitter and measurement electrodes in a resistivity tool can cause erratic resistivity images in oil-based drilling mud.

Different standoffs between the measurement electrodes cause strong cross currents between the measurement electrodes that primarily affect the phase of the measured current. Alteration of the phase results in a leakage of the non-informative imaginary component of the current into the real component of the current, hence, causing inaccurate or erratic measurements of the resistivity.

While the tool is operating in oil-based mud, the different standoffs cause the strong cross-currents because voltage differentials between individual measurement electrodes and the formation become unequal. The unequal voltage differentials cause potential (i.e., voltage) differences between areas of the borehole surface located in front of the measurement electrodes. The cross-currents flow as a result of those potential differences.

For the same reasons described above, while the tool is operating in oil-based mud with the transmitter electrodes having different standoffs, cross-currents can flow between those electrodes and also affect the measurement of the resistivity.

The techniques disclosed herein for improving the accuracy and precision of resistivity measurements call for equalizing the potentials of the areas located in front of the measurement electrodes and the transmitter electrodes. These techniques, which include method and apparatus, are discussed in more detail below.

Figure 1:
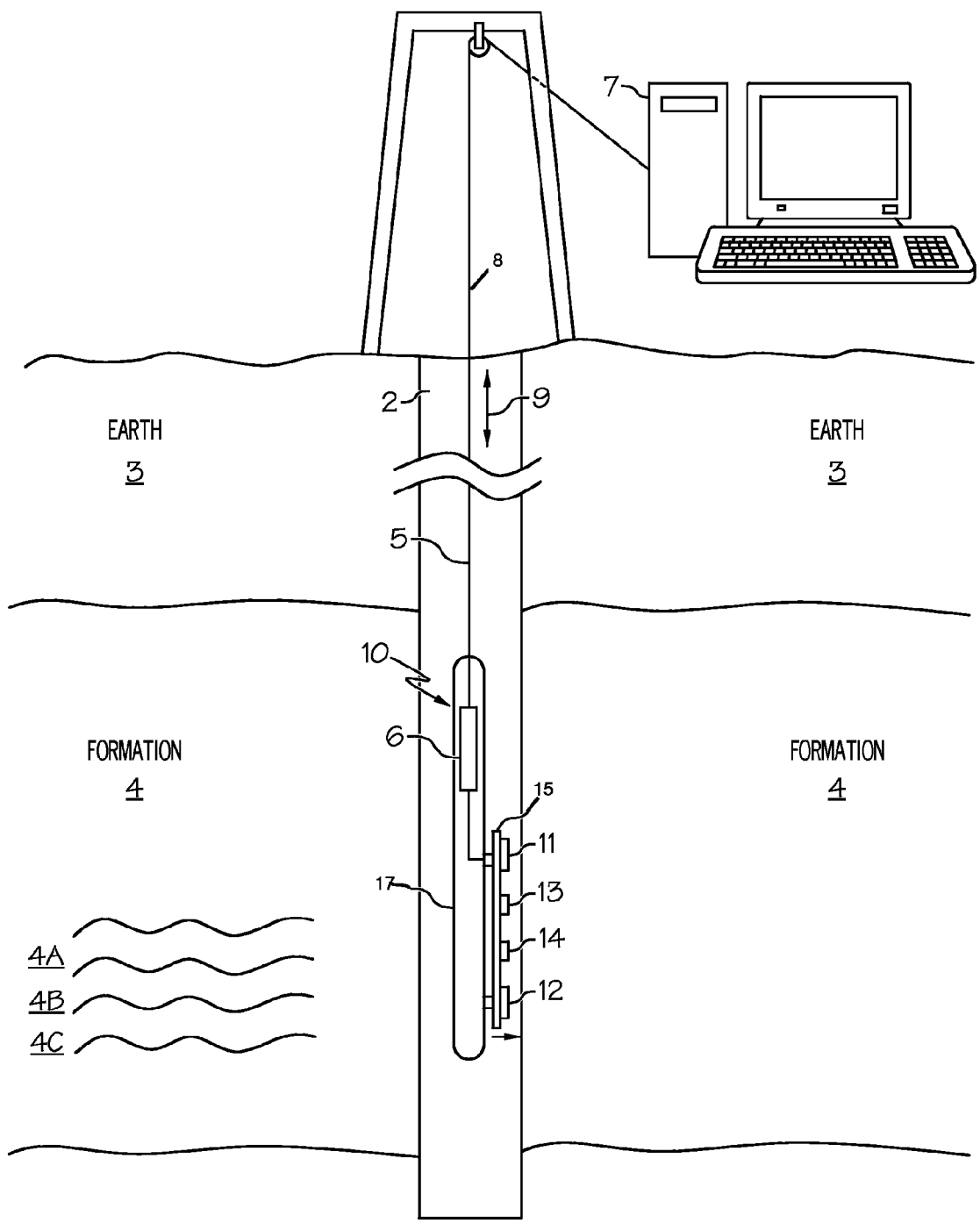
FIG. 1 illustrates an exemplary embodiment of a downhole resistivity tool disposed in a borehole penetrating the earth.

Reference may now be had to FIG. 1 illustrating an exemplary embodiment of a downhole tool 10 disposed in a borehole 2 penetrating the earth 3, which includes an earth formation 4. The earth formation includes layers 4A, 4B, and 4C. The downhole tool 10 is conveyed through the borehole 2 by a carrier 5. In the embodiment of FIG. 1, the carrier 5 is an armored wireline 8. Besides supporting the downhole tool 10 in the borehole 2, the wireline can also provide communications (e.g., data 9) between the downhole tool 10 and a computer processing system 7 disposed at the surface of the earth 3. In logging-while-drilling (LWD) or measurement-while-drilling (MWD) embodiments, the carrier 5 can be a drill string. In order to operate the downhole tool 10 and/or provide a communications interface with the computer processing system 7, the downhole tool 10 includes downhole electronics 6.

Still referring to FIG. 1, the downhole tool 10 is configured to measure the resistivity, or its inverse conductivity, of the formation 4. To measure the resistivity, the downhole tool 10 includes a first transmitter electrode 11, a second transmitter electrode 12, a first current measurement electrode 13 (referred to as the first button electrode 13), and a second current measurement electrode 14 (referred to as the second button electrode 14), all disposed on a pad 15. This electrode configuration may be referred to as a two-button electrode configuration. The pad 15, in one embodiment, is configured to be extended from the downhole tool 10 to make contact with the wall of the borehole 2. The portion of the wall of the borehole 2 at which resistivity measurements are performed may be referred to as a conductive zone due to electrical currents being injected and measured in this zone using the above-mentioned electrodes. It can be appreciated that the downhole tool 10 can have a plurality of pads 15 symmetrically arranged about the tool 10 so that they can extend in unison to contact the wall and provide mutual support to each other to maintain minimal standoff from the wall.

Figure 2:
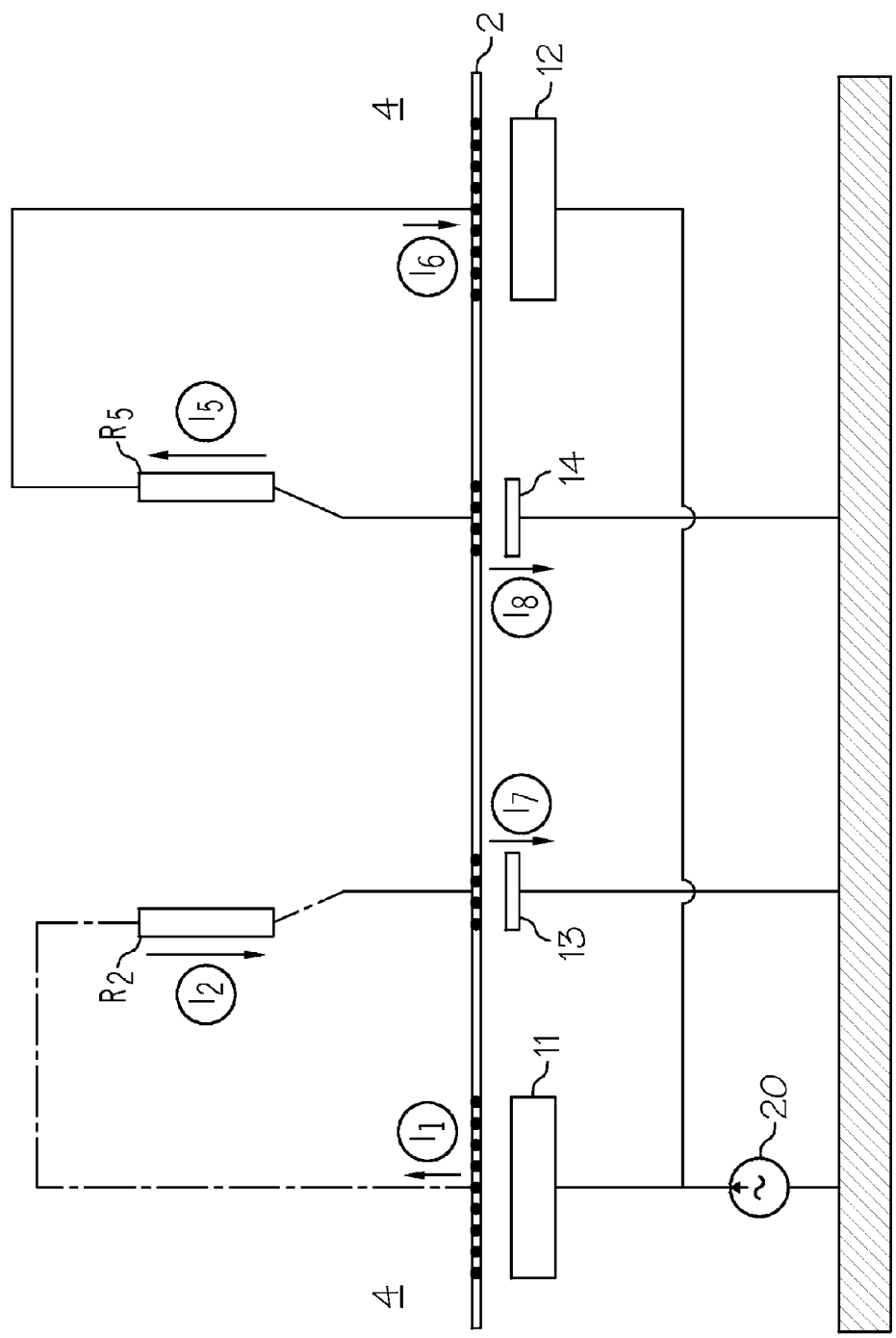
FIG. 2 illustrates an example of measuring formation resistivity without the presence of cross-currents.

Reference may now be had to FIG. 2 illustrating an example of measuring the resistivity of the formation 4 (represented by $R_2$ and $R_5$) using the two-button electrode configuration without the presence of cross-currents. In FIG. 2, $I_1=I_2=I_7$ and $I_8=-I_5=-I_6$. The real parts of $I_7$ and $I_8$ are used to measure the resistivity of the formation 4. The first transmitter electrode 11 and the second transmitter electrode 12 are coupled to a transmitter voltage source 20. The transmitter voltage source 20 is configured to supply transmitter electrodes 11 and 12 with electric energy at one or more selected frequencies and/or amplitudes. Not shown is a receiver coupled to each of the first button electrode 13 and the second button electrode 14. The very low impedance receiver is configured to receive electric currents $I_7$ and $I_8$, provide for its decoupling from following electronics and, if necessary, convert the received electric currents into respective electrical voltage for further processing. Non-limiting embodiments of measurements include voltage, current, and phase angle between the voltage and current. In general, voltage is applied using a tool body or mandrel as a reference.

Figure 3:
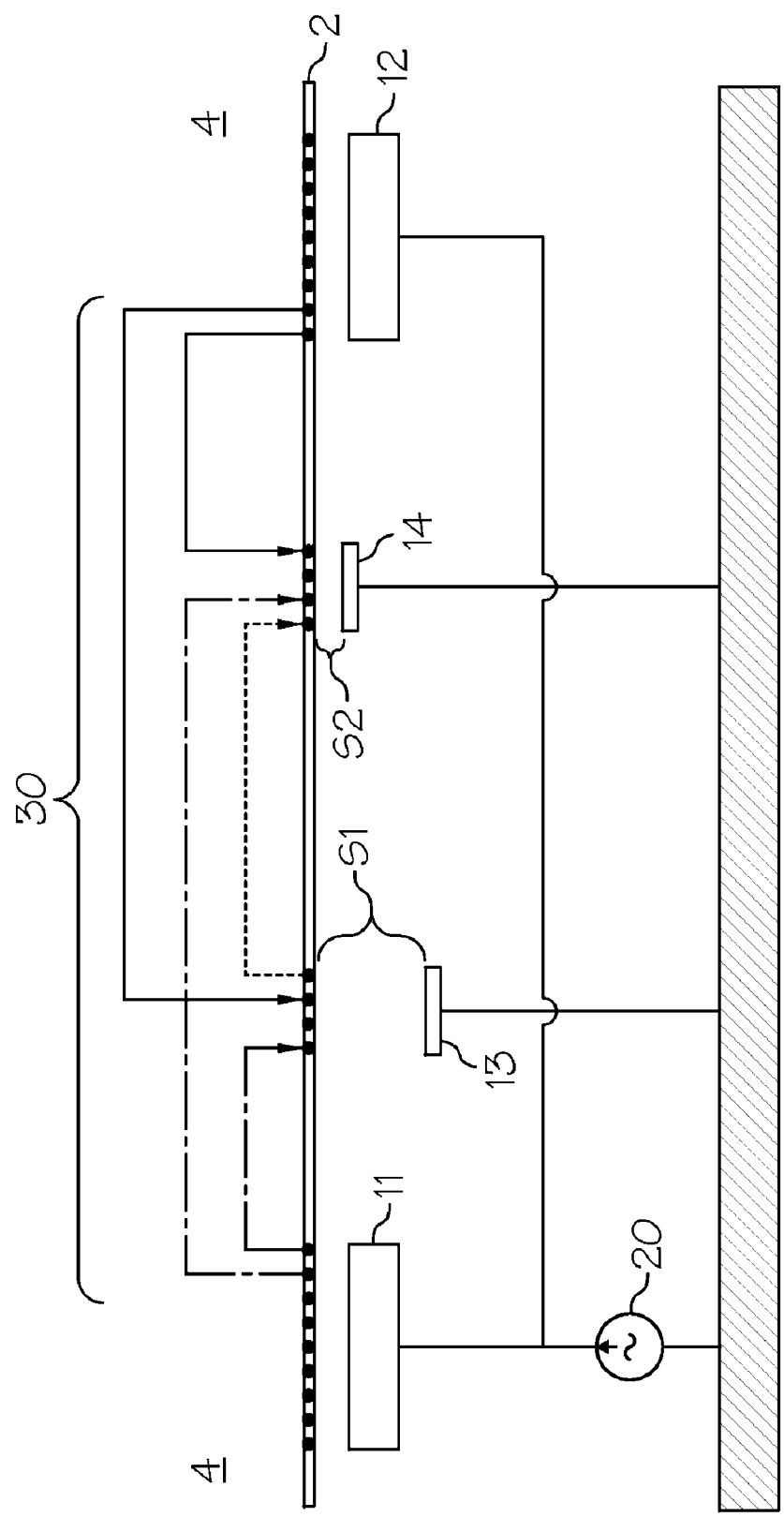
FIG. 3 illustrates an example of measuring formation resistivity with the presence of cross-currents.

Reference may now be had to FIG. 3 illustrating cross-currents 30 due to the standoff S1 of the first button electrode 13 not being the same as the standoff S2 of the second button electrode 14.

Figure 4:
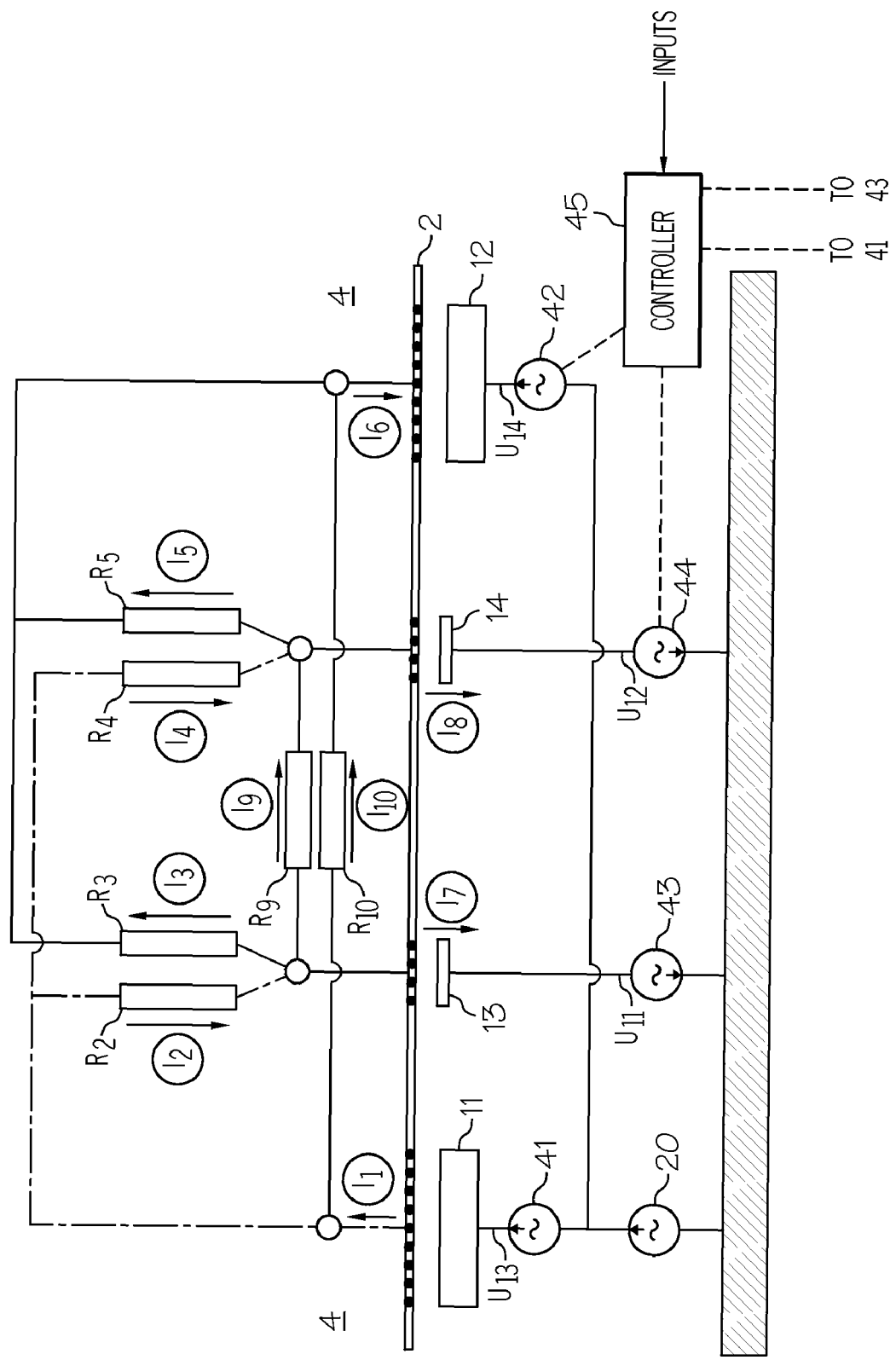
FIG. 4 illustrates an exemplary embodiment the resistivity logging tool with bucker amplifiers.

Reference may now be had to FIG. 4. FIG. 4 illustrates the two-button electrode configuration with labels for each of the measuring currents and the cross-currents. Also shown are a first transmitter bucker amplifier 41 coupled to the first transmitter electrode 11, a second transmitter bucker amplifier 42 coupled to the second transmitter electrode 12, a first measurement bucker amplifier 43 coupled the first button electrode 13, and a second measurement bucker amplifier 44 coupled to the second measurement electrode 14. The bucker amplifiers are configured to supply a voltage that is used to equalize the potentials of the areas located in front of the transmitter and button electrodes. Each of the bucker amplifiers 41, 42, 43, and 44 is coupled to a controller 45. The controller 45 is configured to control the voltage output of each of the bucker amplifiers 41, 42, 43, and 44. In addition, in one or more embodiments, the controller 45 is configured to accept various electrical inputs from various parts (not shown) of the downhole tool 10 in order to determine an output voltage for each of the bucker amplifiers that results in equalizing the potentials of the areas in front of the transmitter and measurement electrodes. For example, voltage measurements at each of the transmitter and measurement electrodes can be used as the inputs. Outputs of other electrical sensors (not shown) may also provide input. For example, these other sensors may obtain electrical measurements along the wall of the borehole 2.

Equalizing the potentials of the areas located in front of the button electrodes includes the following actions:

(a) Measuring the capacitance between each button electrode and the formation 4, $C_j$, j=1, N, where N is the number of button electrodes. The capacitance can be measured by disconnecting all button electrodes but one and applying voltage between the remaining electrode and a metal mandrel 17 (shown in FIG. 1) of the downhole tool 10. Since the mandrel has a very large capacitance to the formation 4, this large capacitance will be in series with the capacitance of the button electrode and, thus, the measured impedance will be representative of the capacitance between the one button electrode and the formation 4.

(b) Introducing the measurement bucker amplifiers 43, 44 as shown in FIG. 4 for each of the button electrodes.

(c) Compensating for the cross-currents 30 by controlling additional complex voltages, $U_{be,j}$, applied to each button electrode by an associated bucker amplifier.

(d) Introducing a balance condition for the bucker amplifier voltage, $U_{be,j}$, and currents, $I_{e,j}$, $I_{e,j+1}$, in the neighboring button electrodes as follows:

$$U_{be,i} = -\frac{I_{e,i}}{i\omega C_i} + \frac{I_{e,i+1}}{i\omega C_{i+1}} \quad (1)$$

(e) Measuring the bucking complex voltage at each button electrode, $U_{be,j}$.
(f) Measuring the complex current flowing through each button electrode,
(g) Calculating the real part of the total impedance at each button electrode, $R_j$, $$R_j = \text{Re}\left(\frac{U_{tr} + U_{be,j}}{I_{e,j}}\right) \quad (2)$$

where $U_{tr}$ is the voltage of an associated transmitter.

Equalizing the potentials of the areas located in front of the transmitter electrodes includes the following actions:
(h) Measuring the capacitance between each transmitter electrode and the formation 4, $CT_j$, j=1, NT, where NT is the number of transmitter electrodes.
(i) Introducing the transmitter bucker amplifiers 41, 42 as shown in FIG. 4 for each of the transmitter electrodes.
(j) Compensating for transmitter electrode cross-currents by controlling additional complex voltages, $U_{bt,j}$, applied to each transmitter electrode.
(k) The balance condition for each transmitter bucker amplifier voltage applied at transmitter electrodes, $U_{bt,j}$, and the transmitter electrode currents, $I_{t,j}$, $I_{t,j+1}$, is as follows:

$$U_{bt,i} = -\frac{I_{t,i}}{i\omega CT_i} + \frac{I_{t,i+1}}{i\omega CT_{i+1}} \quad (3)$$

(l) Measuring additional complex voltages at each transmitter electrode, $U_{bt,j}$.
(m) Calculating the real part of the total impedance at each transmitter electrode, $R_j$, $$R_j = \text{Re}\left(\frac{U_{tr}^* + U_{be,j}}{I_{e,j}}\right) \quad (4)$$

where $U^*_{tr}$ is the voltage created on the borehole surface by each transmitter electrode (in one embodiment, such as in FIG. 4, $U^*_{tr}$ voltages are equal for all transmitters by definition).

Loop-equations can be written to electrically describe the operation of the two-button electrode configuration illustrated in FIG. 4. Equation (5) presents one example of the loop-equations using notation provided in FIG. 4.

$$\begin{bmatrix} \frac{1}{i\omega C_{E1}} & R_2 & 0 & 0 & 0 & 0 & \frac{1}{i\omega C_1} & 0 & 0 & 0 & -1 & 0 & -1 & 0 \\ 0 & -R_2 & 0 & R_4 & 0 & 0 & -\frac{1}{i\omega C_1} & \frac{1}{i\omega C_2} & 0 & 0 & 1 & -1 & 0 & 0 \\ 0 & 0 & R_3 & 0 & -R_5 & 0 & -\frac{1}{i\omega C_1} & \frac{1}{i\omega C_2} & 0 & 0 & 1 & -1 & 0 & 0 \\ 0 & 0 & 0 & 0 & R_5 & \frac{1}{i\omega C_{E2}} & 0 & -\frac{1}{i\omega C_2} & 0 & 0 & 0 & 1 & 0 & 1 \\ 0 & 0 & 0 & 0 & 0 & 0 & -\frac{1}{i\omega C_1} & \frac{1}{i\omega C_2} & R_9 & 0 & 1 & -1 & 0 & 0 \\ \frac{1}{i\omega C_{E1}} & 0 & 0 & 0 & 0 & \frac{1}{i\omega C_{E2}} & 0 & 0 & 0 & R_{10} & 0 & 0 & -1 & 1 \\ 1 & -1 & 0 & -1 & 0 & 0 & 0 & 0 & 0 & -1 & 0 & 0 & 0 & 0 \\ 0 & 0 & 1 & 0 & 1 & -1 & 0 & 0 & 0 & 1 & 0 & 0 & 0 & 0 \\ 0 & 1 & -1 & 0 & 0 & 0 & -1 & 0 & -1 & 0 & 0 & 0 & 0 & 0 \\ 0 & 0 & 0 & 1 & -1 & 0 & 0 & -1 & 1 & 0 & 0 & 0 & 0 & 0 \\ 0 & 0 & 0 & 0 & 0 & 0 & -\frac{1}{i\omega C_1} & \frac{1}{i\omega C_2} & 0 & 0 & 1 & -1 & 0 & 0 \\ 0 & 0 & 0 & 0 & 0 & 0 & 0 & 0 & 0 & 0 & 1 & 0 & 0 \\ \frac{1}{i\omega C_{E1}} & 0 & 0 & 0 & 0 & \frac{1}{i\omega C_{E2}} & 0 & 0 & 0 & 0 & 0 & 0 & -1 & 1 \\ 0 & 0 & 0 & 0 & 0 & 0 & 0 & 0 & 0 & 0 & 0 & 0 & 0 & 1 \end{bmatrix} \begin{bmatrix} I_1 \\ I_2 \\ I_3 \\ I_4 \\ I_5 \\ I_6 \\ I_7 \\ I_8 \\ I_9 \\ I_{10} \\ U_{11} \\ U_{12} \\ U_{13} \\ U_{14} \end{bmatrix} = \begin{bmatrix} U_{tr} \\ 0 \\ 0 \\ -U_{tr} \\ 0 \\ 0 \\ 0 \\ 0 \\ 0 \\ 0 \\ 0 \\ 0 \\ 0 \\ 0 \end{bmatrix} \quad (5)$$

where:
$C_{E1}$ is the capacitance between the first transmitter electrode 11 and the formation 4;
$C_{E1}$ is the capacitance between the second transmitter electrode 12 and the formation 4;
$C_1$ is the capacitance between the first button electrode 13 and the formation 4;
$C_2$ is the capacitance between the second button electrode 14 and the formation 4;
$U_{11}$ is the voltage at the output of the first measurement bucker amplifier 43;
$U_{12}$ is the voltage at the output of the second measurement bucker amplifier 44;
$U_{13}$ is the voltage at the output of the first transmitter bucker amplifier 41;
$U_{14}$ is the voltage at the output of the second transmitter bucker amplifier 42; and
$U_{tr}$ is the voltage output of the transmitter 20.

Because equation (5) electrically describes operation of the two-button electrode configuration, equation (5) can be used to obtain the various electrical parameter values needed to determine the resistivity of the formation 4. For example, by using the bucker amplifiers 41, 42, 43, and 44, the cross-currents can be driven to near zero. Thus, $I_4$, $I_5$, $I_9$, and $I_{10}$ can be set to zero and $I_1=I_2=I_7$ and $I_8=-I_5=-I_6$ (as shown in FIG. 2 with no cross-currents). The real parts of $I_7$ and $I_8$ can be used to determine the formation resistivity.

Figure 5:
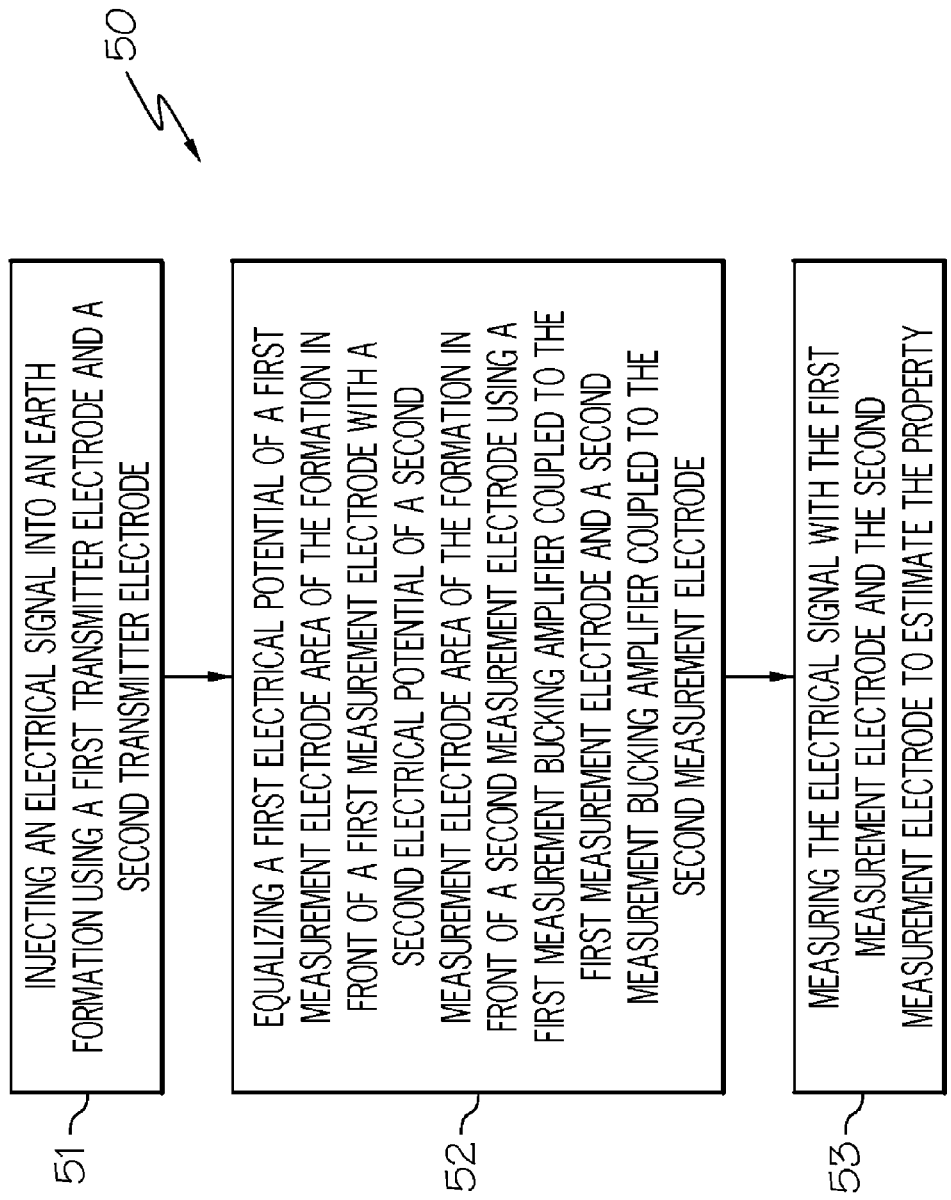
FIG. 5 presents one example of a method for estimating a property of an earth formation.

FIG. 5 presents one example of a method 50 for estimating a property of a formation. The method 50 calls for (step 51) injecting an electrical signal (such as electrical current) into the formation using a first transmitter electrode and a second transmitter electrode. Further, the method 50 calls for (step 52) equalizing a first electrical potential of a first measurement electrode area of the formation in front of a first measurement electrode with a second electrical potential of a second measurement electrode area of the formation in front of a second measurement electrode using a first measurement bucking amplifier coupled to the first measurement electrode and a second measurement bucking amplifier coupled to the second measurement electrode. Step 52 can also include equalizing a potential of each area of the formation in front of the first transmitter electrode and the second transmitter electrode with the areas in front of the first measurement electrode and the second measurement electrode. Further, the method 50 calls for (step 53) measuring the electrical signal (such as the electrical current) using the first measurement electrode and the second measurement electrode to estimate the formation property.

It can be appreciated that more than two transmitter electrodes and/or more than two measurement electrodes can be used in the downhole tool 10. The techniques disclosed herein apply to equalizing the potential of areas in front of all transmitter electrodes and/or all measurement electrodes.

In support of the teachings herein, various analysis components may be used, including a digital and/or an analog system. For example, the downhole electronics 6, the computer processing system 7, or the controller 45 may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order. The term "couple" relates to a first device being coupled directly to a second device or indirectly through an intermediate device.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed:

1. An apparatus for estimating a property of an earth formation penetrated by a borehole, the apparatus comprising:
   a carrier configured to be conveyed through the borehole;
   a first transmitter electrode and a second transmitter electrode disposed at the carrier and configured to inject an electrical current into the earth formation;
   a first measurement electrode and a second measurement electrode disposed at the carrier and configured to measure the electrical current to estimate the property of the earth formation; and
   a first bucker amplifier coupled to the first measurement electrode and a second bucker amplifier coupled to the second measurement electrode, wherein the first and second bucker amplifiers are configured to equalize electrical potentials of areas of the formation in front of the first and second measurement electrodes.

2. The apparatus according to claim 1, further comprising a first transmitter bucker amplifier coupled to the first transmitter electrode and a second transmitter bucker amplifier coupled to the second transmitter electrode, wherein the first and second transmitter bucker amplifiers are configured to equalize electrical potentials of areas of the formation in front of the first and second transmitter electrodes with the electrical potentials of the areas of the formation in front of the first and second measurement electrodes.

3. The apparatus according to claim 2, wherein the equalized electrical potential of areas of the formation in front of the first and second measurement electrodes and the first and second transmitter electrodes reduce cross-currents between:
the first and second measurement electrodes;
the first and second transmitter electrodes;
the first transmitter electrode and the second measurement electrode; and
the second transmitter electrode and the first measurement electrode.

4. The apparatus according to claim 1, further comprising a controller coupled to the first and second measurement bucker amplifiers wherein the controller is further configured to adjust an output voltage of each bucker amplifier to equalize the electrical potentials of the areas of the formation.

5. The apparatus according to claim 1, further comprising a transmitter coupled to the first and second transmitter electrodes and configured to transmit the electrical signal at frequency f.

6. The apparatus according to claim 1, further comprising a capacitor configured to be switched in series with the first measurement electrode with the second measurement electrode disconnected and of sufficient capacitance such that when a voltage is applied between the first measurement electrode and the capacitor a measured impedance to current flowing through the first electrode and the capacitor is indicative of capacitance between the first measurement electrode and the formation.

7. The apparatus of claim 1, wherein the borehole is filled with oil-based drilling mud.

8. The apparatus according to claim 1, wherein the first measurement electrode is disposed a first measurement standoff from a conductive zone in the formation and the second measurement electrode is disposed a second measurement standoff from the conductive zone, the first standoff being different from the second standoff.

9. The apparatus according to claim 1, wherein the property is resistivity or its inverse conductivity.

10. The apparatus according to claim 1, wherein the property is a boundary between layers of the formation.

11. The apparatus of claim 1, wherein the first transmitter electrode and the second transmitter electrode comprise three or more transmitter electrodes.

12. The apparatus of claim 1, wherein the first measurement electrode and the second measurement electrode comprise three or more measurement electrodes.

13. The apparatus according to claim 1, wherein the carrier comprises at least one of a wireline, a slickline, a drill string, and coiled tubing.

14. A method for estimating a property of an earth formation, the method comprising:
injecting an electrical current into the formation using a first transmitter electrode and a second transmitter electrode;
equalizing a first electrical potential of a first measurement electrode area of the formation in front of a first measurement electrode with a second electrical potential of a second measurement electrode area of the formation in front of a second measurement electrode using a first measurement bucking amplifier coupled to the first measurement electrode and a second measurement bucking amplifier coupled to the second measurement electrode; and
measuring the electrical current with the first measurement electrode and the second measurement electrode to estimate the property.

15. The method according to claim 14, further comprising equalizing a third electrical potential of a first transmitter electrode area of the formation in front of the first measurement electrode with a fourth electrical potential of a second transmitter electrode area of the formation in front of the second transmitter electrode using a first transmitter bucker amplifier coupled to the first transmitter electrode and a second transmitter bucker amplifier coupled to the second transmitter electrode, the third and fourth electrical potentials being equalized with the first and second electrical potentials.

16. The method according to claim 15, controlling the first and second transmitter bucker amplifiers and the first and second measurement bucker amplifiers with a controller to equalize the first, second, third, and fourth potentials.

17. The method according to claim 14, further comprising measuring capacitance $C_1$ between the first measurement electrode and the formation, measuring capacitance $C_2$ between the second measurement electrode and the formation, and using $C_1$ and $C_2$ to estimate the property.

18. The method according to claim 17, further comprising measuring capacitance $C_{E1}$ between the first transmitter electrode and the formation, measuring capacitance $C_{E2}$ between the second measurement electrode and the formation, and using $C_{E1}$ and $C_{E2}$ to estimate the property.

19. The method according to claim 14, wherein the property is resistivity or its inverse conductivity.

20. A non-transitory computer readable medium comprising computer executable instructions for estimating a parameter of an earth formation by implementing a method comprising:
injecting an electrical current into the formation using a first transmitter electrode and a second transmitter electrode;
equalizing a first electrical potential of a first measurement electrode area of the formation in front of a first measurement electrode with a second electrical potential of a second measurement electrode area of the formation in front of a second measurement electrode using a first measurement bucking amplifier coupled to the first measurement electrode and a second measurement bucking amplifier coupled to the second measurement electrode; and
measuring the electrical current with the first measurement electrode and the second measurement electrode to estimate the property.

* * * * *